(12) United States Patent
Du et al.

(10) Patent No.: US 8,431,823 B2
(45) Date of Patent: Apr. 30, 2013

(54) CABLE MANAGEMENT AND IDENTIFICATION DEVICE

(75) Inventors: Yinggang Du, Austin, TX (US); Julia Heard, Austin, TX (US); Scott Lauffer, Austin, TX (US)

(73) Assignee: Dell Products L.P., Round Rock, TX (US)

(*) Notice: Subject to any disclaimer, the term of this patent is extended or adjusted under 35 U.S.C. 154(b) by 164 days.

(21) Appl. No.: 13/037,815

(22) Filed: Mar. 1, 2011

(65) Prior Publication Data
US 2012/0222882 A1 Sep. 6, 2012

(51) Int. Cl.
*H02G 3/04* (2006.01)
(52) U.S. Cl.
USPC ........ 174/68.3; 174/68.1; 174/135; 174/72 A; 248/74.1
(58) Field of Classification Search ................ 174/68.1, 174/68.3, 480, 481, 72 R, 72 A, 91, 92, 88 R, 174/95, 40 CC, 135; 248/68.1, 74.1, 74.2, 248/74.3, 74.4; 439/369, 370; 385/134, 385/135
See application file for complete search history.

(56) References Cited

U.S. PATENT DOCUMENTS

| | | | |
|---|---|---|---|
| 4,340,200 A | 7/1982 | Stegmeier | |
| 5,347,084 A * | 9/1994 | Roney et al. | 174/92 |
| 5,663,527 A * | 9/1997 | Hui | 174/68.3 |
| 6,354,543 B1 * | 3/2002 | Paske | 248/68.1 |
| 6,378,811 B1 * | 4/2002 | Potter et al. | 248/68.1 |
| 6,561,466 B1 * | 5/2003 | Myers et al. | 248/68.1 |
| 6,637,075 B1 | 10/2003 | Gorman et al. | |
| 6,777,618 B2 | 8/2004 | Bond et al. | |
| 6,889,944 B2 * | 5/2005 | Brandzel et al. | 248/68.1 |
| 6,899,305 B2 * | 5/2005 | Korczak et al. | 248/68.1 |
| 7,097,142 B1 * | 8/2006 | Schmidt | 248/68.1 |
| 7,134,200 B2 | 11/2006 | Boldy | |
| 7,421,183 B2 * | 9/2008 | Vongseng | 385/135 |
| 7,488,195 B2 * | 2/2009 | Sokol et al. | 439/369 |
| 7,612,288 B1 | 11/2009 | Gundogan et al. | |
| 7,663,060 B2 * | 2/2010 | Nelson et al. | 174/68.1 |

* cited by examiner

*Primary Examiner* — Angel R Estrada
(74) *Attorney, Agent, or Firm* — Haynes and Boone, LLP

(57) ABSTRACT

A cable management device is provided, which includes a first leg and a second leg connected by a connecting crown member. A first protrusion extends from the first leg. A second protrusion extends from the second leg. The first leg and the second leg both include an aperture. The cable management device includes passageway defined by an inner-surface of the first leg, an inner-surface of the second leg, and an inner-surface of the connecting crown member. The passageway is operable to hold a cable.

20 Claims, 7 Drawing Sheets

CABLE MANAGEMENT AND IDENTIFICATION DEVICE

BACKGROUND

The present disclosure relates generally to information handling systems, and more particularly to a cable management and/or identification device.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some types of IHS include a quantity of cables coupled to the IHS, for example, bringing information, power, or the like to and from the IHS. One such IHS is a storage appliance (e.g., server). In a typical embodiment, a storage appliance may have over 20 network ports for connection, and corresponding cables for each port. Thus, configurations of racks of such IHSs could include over a hundred such cables, making identification and/or management of cables even more challenging.

Accordingly, it would be desirable to provide an improved manner of identification and/or management of cables for IHSs.

SUMMARY

According to one embodiment, a cable management device is provided. The cable management device includes a first leg and a second leg connected by a connecting crown member. A first protrusion extends from the first leg. A second protrusion extends from the second leg. The first leg and the second leg both include an aperture. The cable management device includes passageway defined by an inner-surface of the first leg, an inner-surface of the second leg, and an inner-surface of the connecting crown member. The passageway is operable to hold a cable.

In another embodiment described, an information handling system (IHS) is provided, which includes a chassis and a cable assembly extending from the chassis. The cable assembly includes at least a first and second cable. A first cable management device is connected to the first cable such that the first cable extends through a passageway of the first cable management device. A second cable management device is connected to the second cable such that the second cable extends through a passageway of the second cable management device. The first and second cable management devices are operable to be interlocked by positioning a protrusion of the second device into an aperture of the first device.

In yet another embodiment, a method of cable management is described. The method includes providing a cable assembly having a first and second cable and providing a first and a second cable management device. The first and the second cable management devices may each be U-shaped. The first cable management device is attached to the first cable; the second cable management device is attached to the second cable. The first cable management device and the second cable management device are interlocked by positioning a portion of the first cable management device into an aperture in the second cable management device.

DETAILED DESCRIPTION

It is to be understood that the following disclosure provides many different embodiments, or examples, for implementing different features of various embodiments. Specific example components and arrangements are described below to simplify the present disclosure. These are, of course, merely examples and not intended to be limiting. For example, as illustrated a cable assembly includes several cables neatly arranged. However, in other situations it may be typical for a vast number of cables to be present and to be tangled and twisted amongst themselves.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
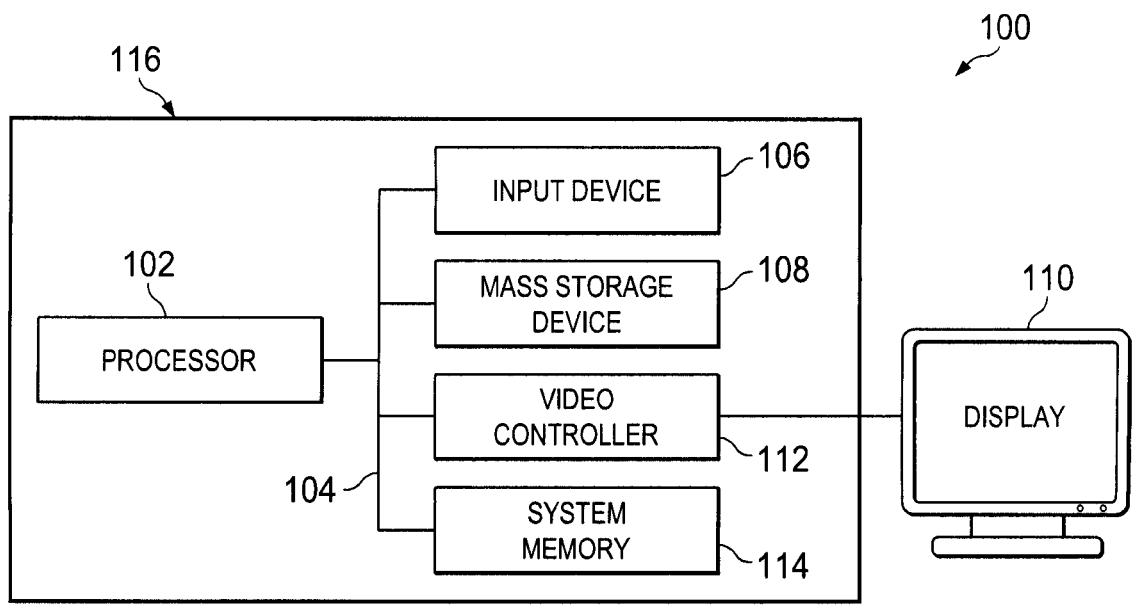
FIG. 1 is a schematic view illustrating an embodiment of an information handling system (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Referring now to FIGS. 2, 3, 4, 5, 6, and 7, illustrated are various perspectives of a cable management device 200. The cable management device 200 is operable to attached to a cable of an IHS to provide identification and/or management (e.g., grouping) of the cable(s) as further described herein. The cable management device 200 has a U-shape. Specifically, the cable management device 200 includes a first leg 202 and an opposing second leg 204. The legs 202 and 204 are of substantially equal length. The legs 202 and 204 are substantially coterminus. The leg 202 and the leg 204 are connected at one end by a connecting crown 206. The leg 202, the leg 204, and the connecting crown 206 may be a unitary piece, for example, formed by injection molding. The opposing end of each of the legs 202 and 204 is free. The free ends may be resiliently biased, as further discussed below.

The legs 202 and 204 and connecting crown 206 each have an inside surface, which dimension defines a passageway 208. The passageway 208 is configured to accept a cable. The legs 202 and/or 204 also include an outside surface. The outside surface may be suitable to accept a label, for example, identifying the type of cable, the functionality of the cable, the associated IHS for the cable, and/or other suitable identification for a cable disposed in the passageway 208.

The legs 202 and 204 each include an aperture 210. The aperture 210 may be an opening in the legs 202 and 204 that traverses from an inner surface defining the passageway 208, to an outer surface of the leg. The legs 202 and 204 each include a protrusion 212 (e.g., foot). The protrusion 212 includes a length L1 that is substantially similar to a length L2 of the aperture 210. The protrusion 212 may be a unitary piece with the leg 202 and/or 204, for example, as formed by injection molding. The protrusion 212 may be referred to as a latching feature. The aperture 210 may be referred to as a receiving feature. The protrusion 212 and the aperture 210 function as elements of an interlock mechanism, which allows multiple cable management devices (e.g., multiple devices 200) to be clipped in series, as further described below. In an embodiment, the protrusion 212 is configured such that after passing through the aperture 210 of an adjacent device, the protrusion 212 extends into the passageway 208 of the adjacent device. The aperture 210 may also, or alternatively, be used to receive cable ties, straps (e.g., Velcro straps), and/or other securing devices suitable for cable management.

A plurality of securing members 214 are disposed on the inner-surface of the leg 202 and/or leg 204. The securing members 214 include features (e.g., protrusions) that are operable to hold a cable disposed in the passageway 208.

Figure 7:
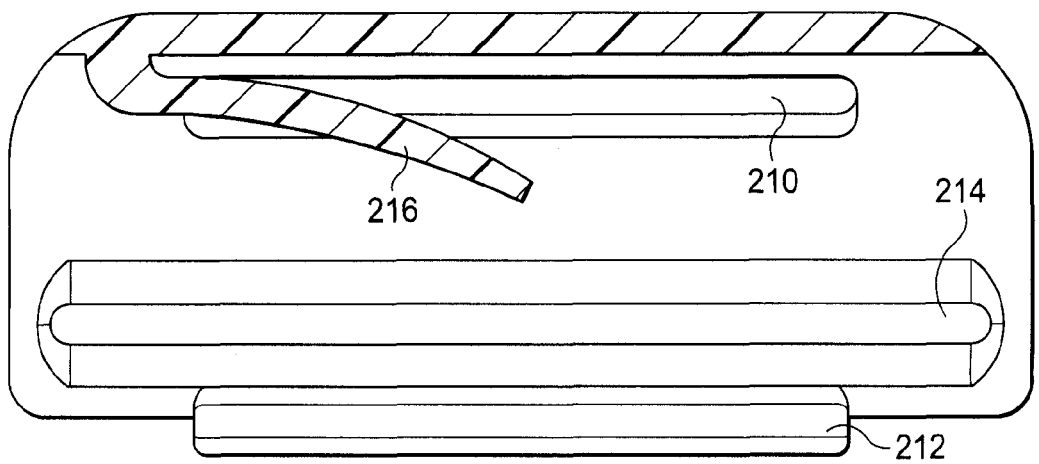
FIG. 7 is a cross-sectional view of the embodiment of a cable management device illustrated in FIG. 2.

A cable positioning member 216 is disposed on the inner-surface of the connecting crown 206. The cable positioning member 216 may allow the cable management device 200 to be attached to cables of differing circumferences, while in each case allowing the device 200 to remain stationary on the cable. For example, the cable management device 200 will not slip or move down the cable without external force (e.g., by a user). This may be referred to herein as selectively moveable. The cable positioning member 216 configuration and/or material may allow for the member 216 to be deformed when a cable applies force to the member 216. Specifically, the cable positioning member 216 may deform to various extents depending on the circumference of a cable disposed in the passageway 208 (e.g., a greater circumference cable may provide for greater deformation of the cable positioning member). The cable positioning member 216 may be resiliently biased such that the cable positioning member 216 returns to a biased position (e.g., resting position) after a cable is removed from the passageway 208. This reliantly biased property or deformation-ability may provide a spring-like motion. FIG. 7 illustrates an embodiment of the cable positioning member 216 in its biased position.

Thus, the securing members 214 and/or the cable positioning member 216 may be operable to position each of a plurality of sizes of cables in the passageway 208. The securing members 214 and/or cable positioning member 216 may also be operable to hold a cable disposed in the passageway 208 in position, while providing a force against the cable. The force may allow for the cable management device 200 to be positioned on the cable such that it will not slide without the application of external force. In other words, the cable management device 200 allows for the cable to be selectively moveable. The securing members 214 and/or cable positioning member 216 may be part of the unitary body including the legs 202 and 204, connecting crown 206, protrusion 212, and/or other elements of the device 200. Alternatively, the securing members 214 and/or cable positioning may be of a different material type. The securing members 214 may traverse approximately the entire length D3 of the device 200. The cable positioning member 216 may traverse a portion of the length of the device 200, as illustrated in FIG. 7.

The legs 202 and 204 may have free ends that are divergent inward slightly, when no force is being applied to the cable management device 200. In other words, at their biased position (e.g., without external applied force), the legs 202 and 204 at their free ends (e.g., at the point of the protrusions 212) have a spacing that is slightly less than the spacing of legs 202 and 204 at the end adjoining the connecting crown 206. This allows the free ends of the legs 202 and/or 204, and the respective protrusions 212, to be deformed slightly outwardly to be positioned in an aperture of another cable management device (e.g., a device substantially similar to the device 200 including the aperture 210), as described in further detail below. The free ends of the legs 202 and/or 204, and the protrusions 212, then would return to its biased position to the extent allowed by the attached device. This is described herein as legs 202 being resiliently biased.

The device 200 may be a unitary piece. In an embodiment, the device 200 is a single molded plastic part. The device 200 may be provided in any color and/or a variety of colors. In an embodiment, the device 200 may include a designation identifying a manufacturer, an IHS, and/or other suitable designation. In an embodiment, the designation may be molded into the plastic.

Figure 4:
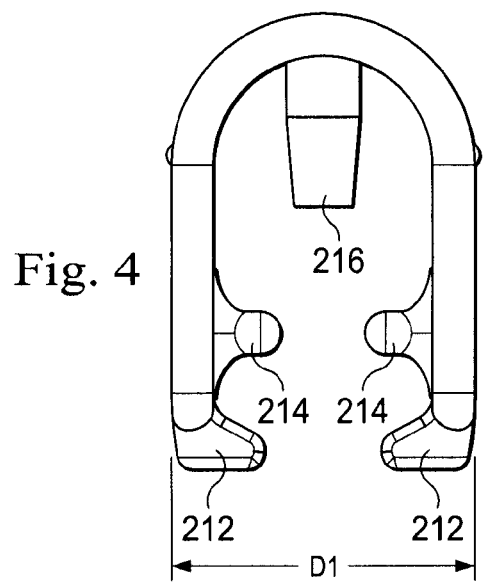
FIG. 4 is a cross-sectional view of the embodiment of a cable management device illustrated in FIG. 2.
Figure 5:
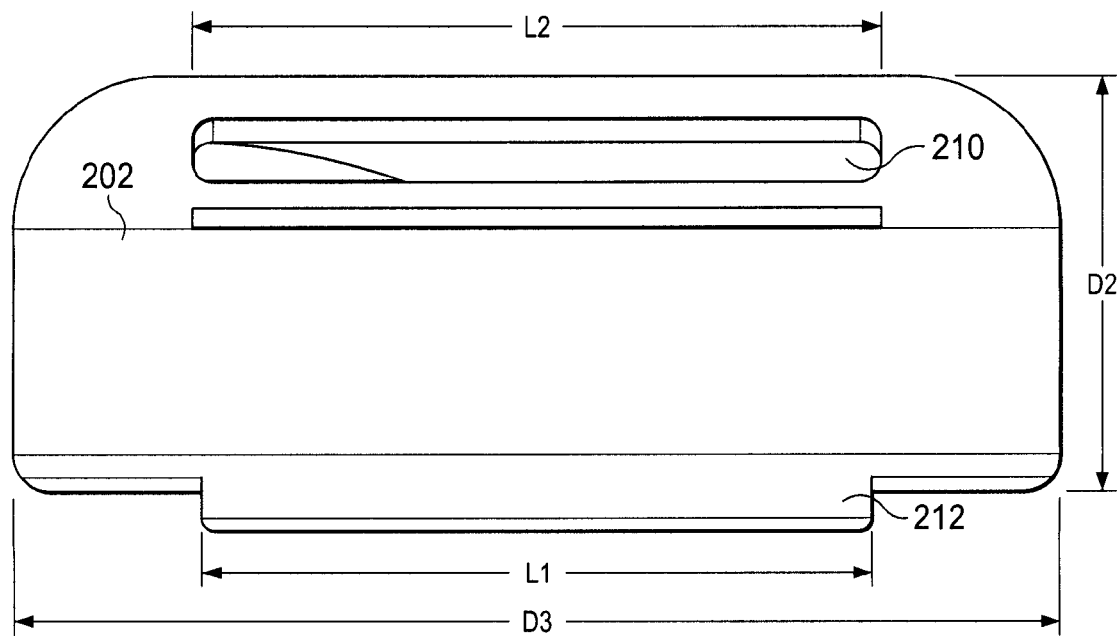
FIG. 5 is side view of the embodiment of a cable management device illustrated in FIG. 2.
Figure 6:
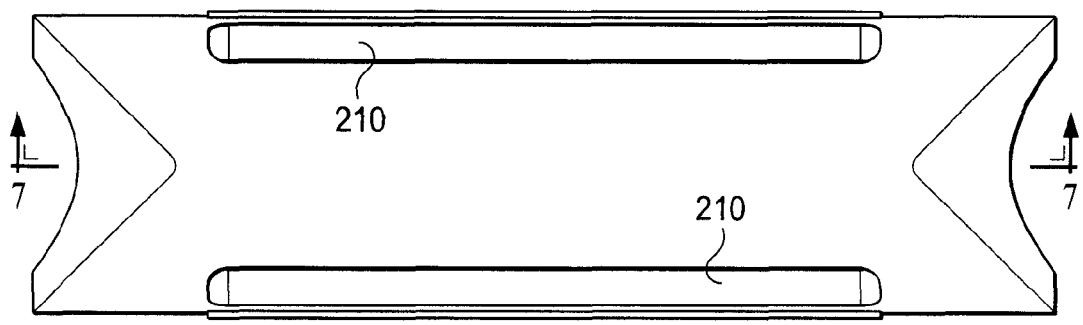
FIG. 6 is top view of the embodiment of a cable management device illustrated in FIG. 2.

In an embodiment, the device 200 includes a width D1 of approximately 10 mm, as illustrated in FIG. 4. In an embodiment, the device 200 includes a height D2 of approximately 14 mm, as illustrated in FIG. 5. In an embodiment, the device 200 includes a length D3 of approximately 34 mm. In an embodiment, the aperture 210 and/or the protrusion 212 include a length L2 and L1 respectively, of approximately 20 mm. These dimensions are provided for exemplary purposes and are not intended to be limiting.

Figure 8:
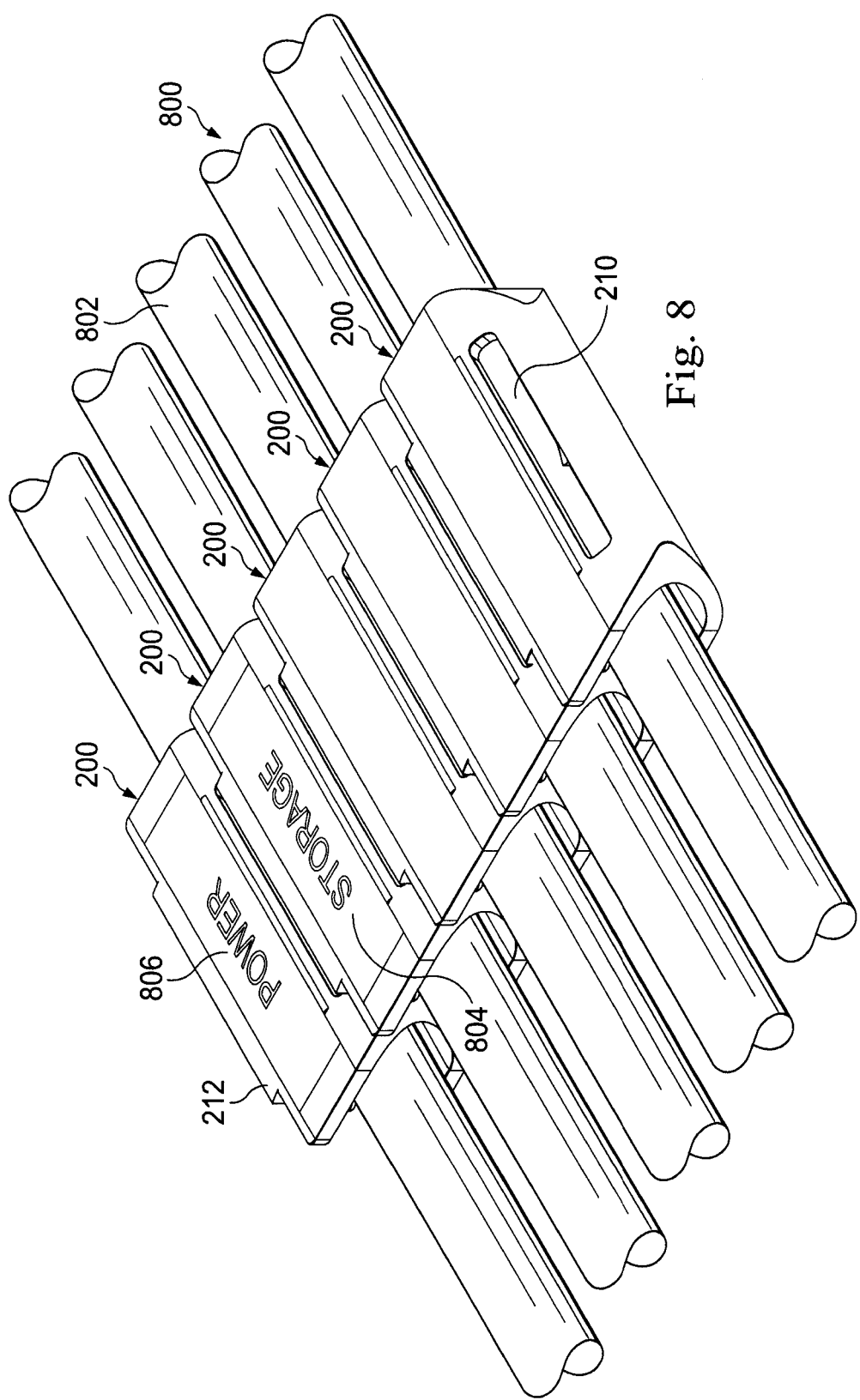
FIG. 8 is a perspective view of an embodiment of a cable assembly including a plurality of cable management devices.

Referring now to FIG. 8, illustrated is a cable assembly 800 including a plurality of cable management devices 200, each disposed on a cable 802. The cable management devices 200 are interlocked (attached) in series. The cable management devices 200 may be substantially similar to as discussed above with reference to FIGS. 2, 3, 4, 5, 6, and 7. Each cable 802 is positioned in a passageway of the device 200, which may be substantially similar to as described above with reference to the passageway 208. The cables 802 may be associated with the same or different IHSs. The cables 802 may carry power, data, combinations thereof, and/or other suitable information to or from an IHS. The cables 802 may be of different or similar sizes (e.g., circumferences).

The cable assembly 800 illustrates a label 804 affixed to the outside surface of one of the legs of the cable management device 200. The label 804 may be adhesively applied to the cable management device 200. The cable assembly 800 also illustrates a label 806 provided on the outside surface of one of the legs of the device 200. The label 806 may be applied using an ink or other writing material directly onto the cable management device 200. Numerous other suitable labeling methods may be suitable for the cable management device 200.

The cable assembly 800 further illustrates the interlocking features of the cable management device 200. Specifically, the protrusions of one cable management device 200 are disposed within the aperture of an adjacent cable management device 200. As illustrated above with reference to FIGS. 2, 3, 4, 5, 6, and 7, the protrusion 212, or portion thereof, is disposed within the aperture 210 of an adjacent device. The protrusion 212 interlocked with the aperture 210 (e.g., disposed in the aperture 210) allows the cable management devices 200 to be coupled or joined such that an outside force must be applied to separate the cable management devices 200. For example, as a user may apply a force (e.g., by hand or by machine) to deform the legs of the cable management device 200 such that the protrusion is dislodged from the aperture. Being resiliently biased, the cable management device 200 and its legs will return to its biased (e.g., slightly inward leaning) position and be available for attachment with another cable management device 200.

The cable assembly 800 may include cable management devices 200 having different colors. In an embodiment, the cable management devices 200 of the cable assembly 800 have substantially similar dimensions. As illustrated in FIG. 8, the cable management devices 200 at the termination of the series of cable management devices 200, have an aperture 210 and protrusion 212, respectively, which are available for attachment to another device, such as another cable management device 200, a securing device (e.g., cable tie, strap), and/or other suitable features. Though illustrated in FIG. 8 as five cable management devices with corresponding cables in series, any number of cable management devices 200 and cables 802 may be included in a cable assembly.

Figure 9:
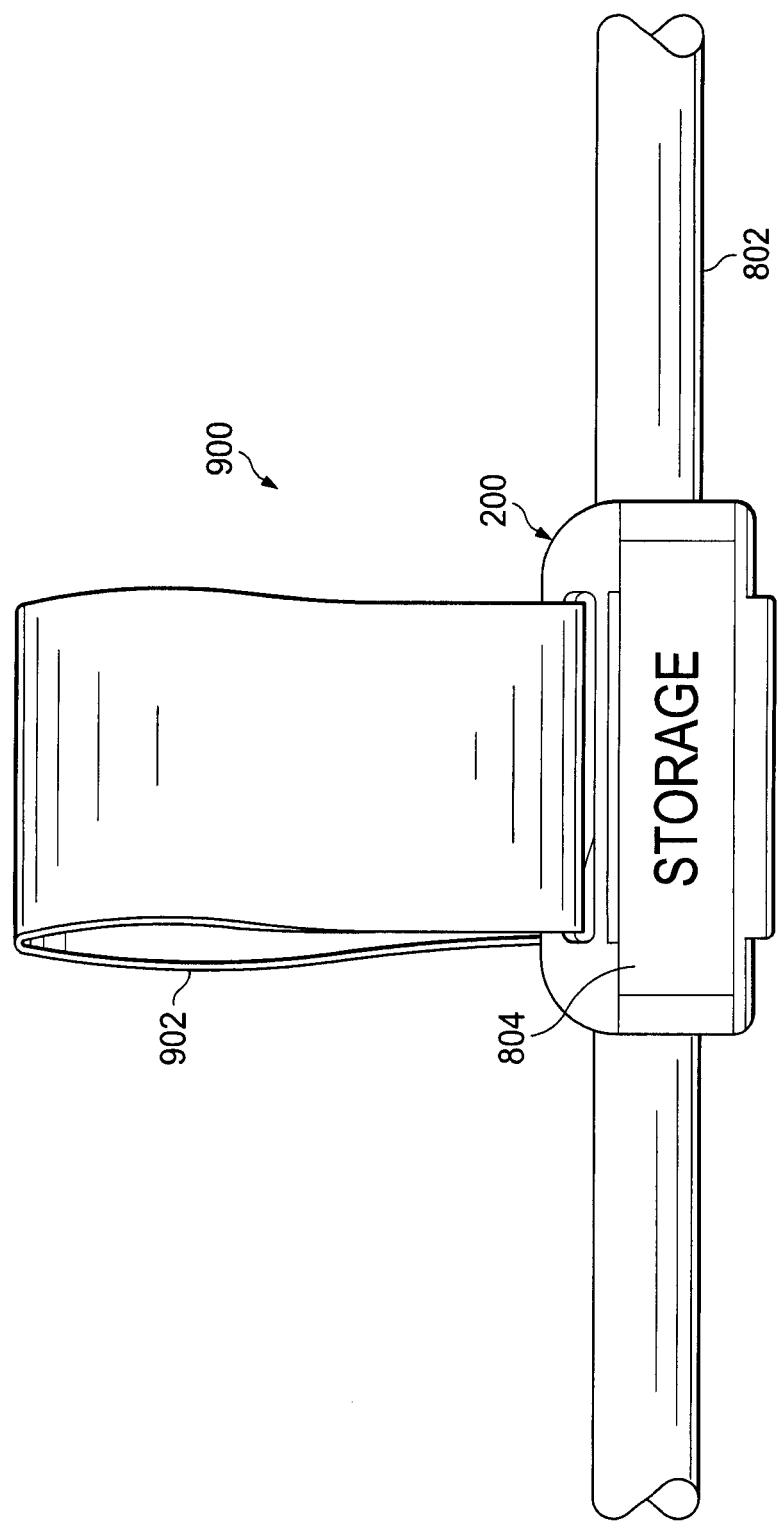
FIG. 9 is a side view of an embodiment of a cable management device disposed on a cable and including a securing device.

Referring now to FIG. 9, illustrated is a cable assembly 900 having a cable management device 200 with a securing device 902 attached thereto. Specifically, as illustrated, the cable 802 is disposed in the passageway of the cable management device 200 and the label 804 is affixed to the cable management device 200. The cable 802 and label 804 may be substantially similar to as discussed above with reference to FIG. 8. A securing device 902 is attached to cable management device 200. In an embodiment, the securing device 902 is attached through an aperture in the cable management device 200. The aperture may be substantially similar to the aperture 210 described above with reference to FIGS. 2, 3, 4, 5, 6, and 7. The securing device 902 may be a strap with adhesive structure formed thereon. In an embodiment, the securing device 902 is a strap including an adhesive structure of Velcro or other suitable attachment means. In an embodiment, the securing device 902 is a tie (e.g., cable tie). The securing device 902 may be used to secure the cable assembly 900 to another cable assembly, an IHS, a piece of equipment (e.g., rack), and/or other suitable location.

Figure 10:
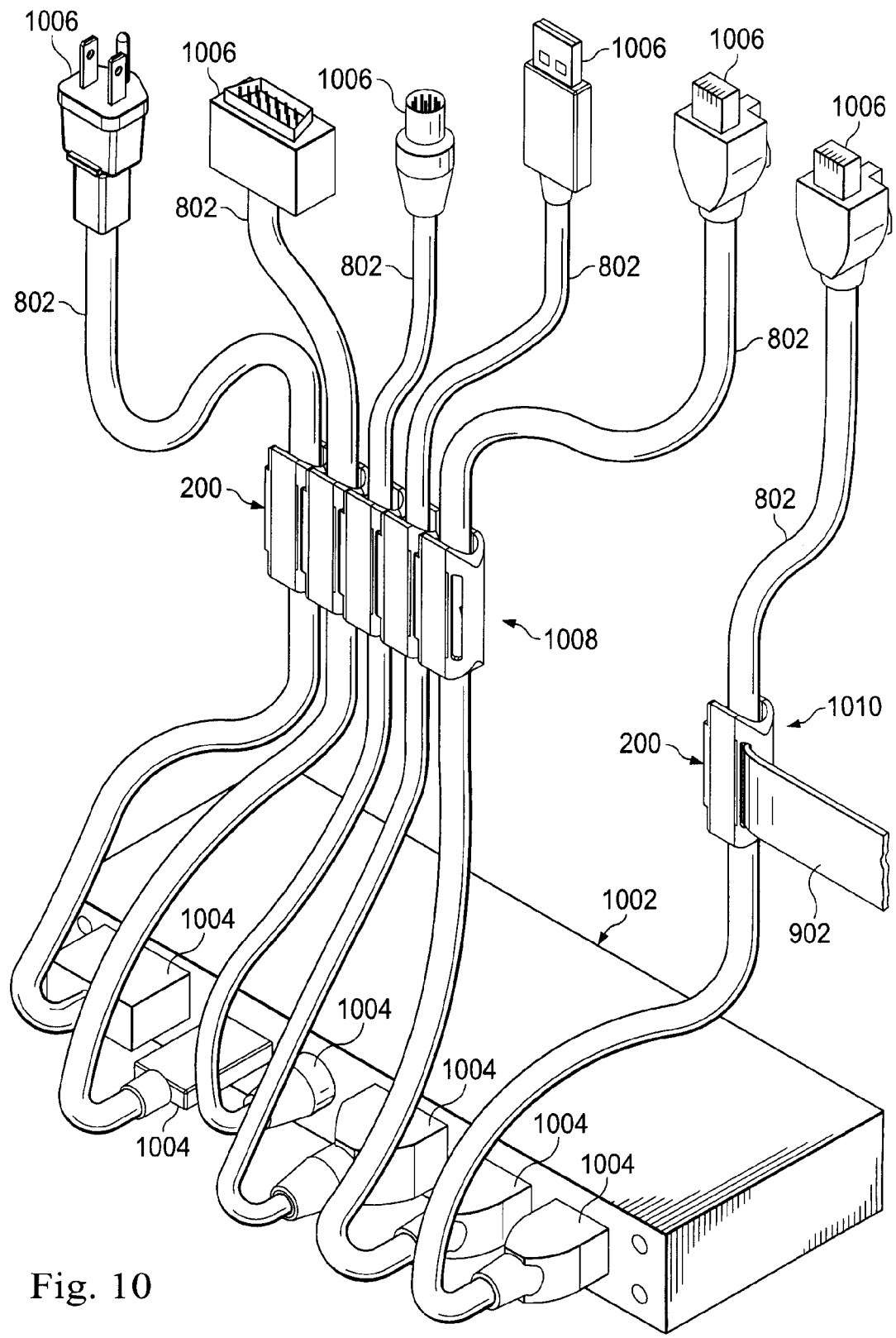
FIG. 10 is a perspective view of an embodiment of an IHS and cable assembly including cable management devices.

Referring now to FIG. 10, illustrated is a cable assembly 1000 connected to an IHS 1002. The IHS 1002 may be substantially similar to the IHS 100, described above with reference to FIG. 1. In an embodiment, the IHS 1002 is a server or storage appliance. The cable assembly 1000 includes a plurality of cables 802 that are connected to ports 1004 of the IHS 1002. The cable assembly 1000 illustrates that the cables 802 may be of differing sizes (e.g., circumferences). The cable assembly 1000 further illustrates that the cables 802 may perform different functions (as indicated by the type of different connectors 1006). The cables 802 may carry information (e.g., data) and/or power to and from the IHS 1002.

In the illustrated embodiment, each of the cables 802 of the cable assembly 1000 has a cable management device 200 disposed thereon. The cable management device 200 may be substantially similar to as described above with reference to FIGS. 2, 3, 4, 5, 6, 7, 8 and/or 9. The cable management devices 200 and their corresponding interlocking features allow for a first cable management group 1008. A second cable management group 1010 includes a single cable management device 200 disposed on the cable 802 and securing device 902, which may be substantially similar to as described above with reference to FIG. 9. The first cable management group 1008 and the second cable management group 1010 are exemplary only and not intended to be limiting. A cable management group may include any number of cables, any number of interlocked cable management devices, and/or a single cable/cable management device. In an embodiment, one or more cables of a cable assembly do not have a cable management device disposed thereon.

Figure 11:
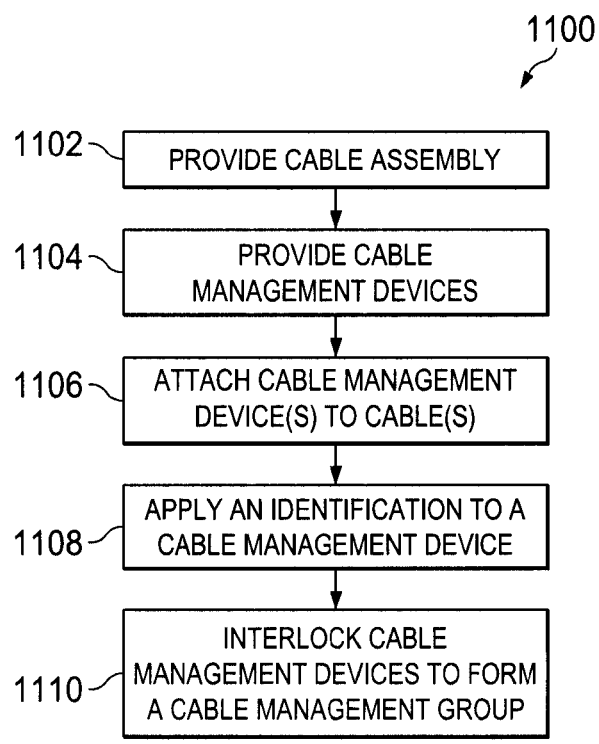
FIG. 11 is a flowchart illustrating an embodiment of a method of cable management.
Figure 2:
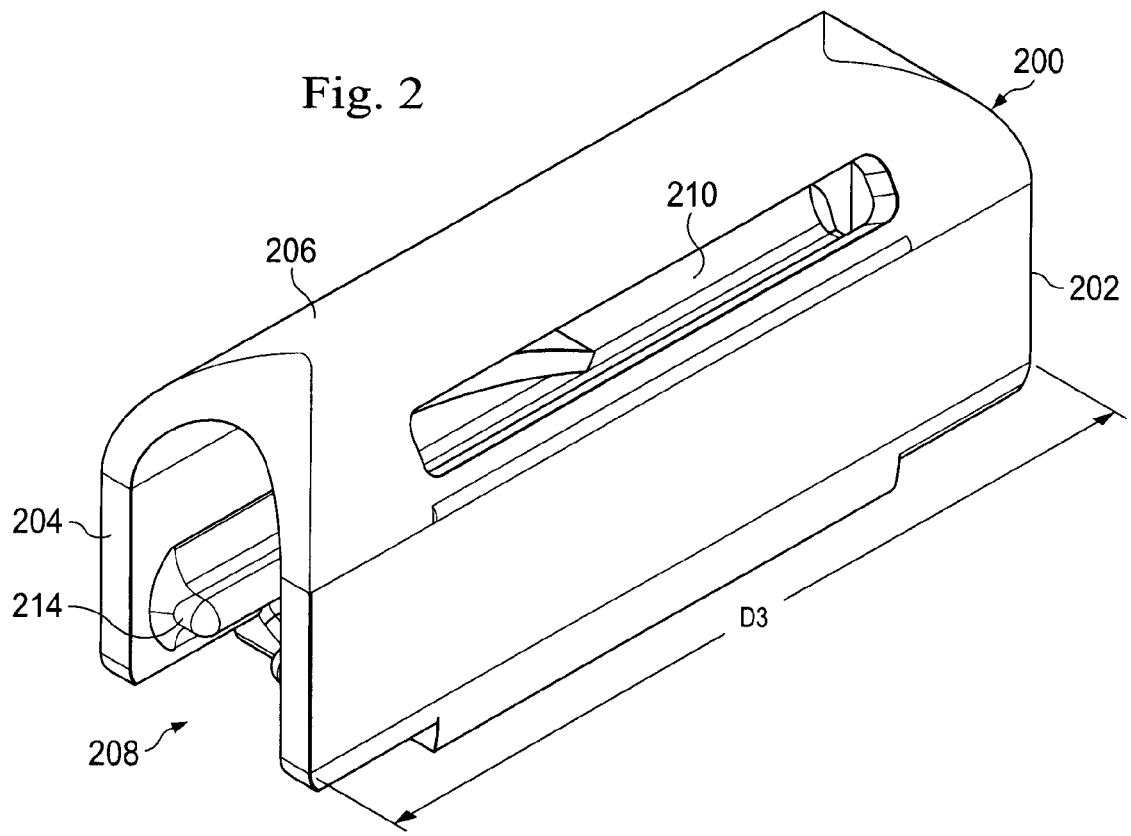
FIG. 2 is a perspective view of an embodiment of a cable management device.
Figure 3:
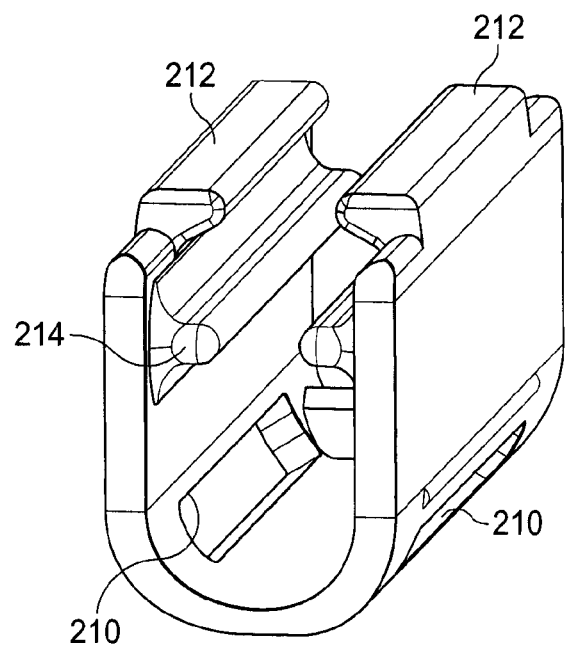
FIG. 3 is another perspective view of the embodiment of a cable management device illustrated in FIG. 2.

Referring now to FIG. 11, illustrated is a method 1100 of cable management and/or identification. The method beings at step 1102 where a cable assembly is provided. The cable assembly may include any plurality of cables. The cables may be attached to an IHS. The cables may be operable to transmit power and/or information to and/or from the IHS. The cables may have varying functionalities. In an embodiment, the cable assembly includes a plurality of cables from different IHSs.

The method 1100 then proceeds to step 1104 where a plurality of cable management devices are provided. The cable management devices may be substantially similar to the cable management device 200, described above with reference to FIGS. 2, 3, 4, 5, 6, and 7. The cable management devices may be provided in one or more colors.

The method 1100 then proceeds to step 1106 where a cable management device is attached to each of one or more of the cables. The cable management device may be disposed on the cable such that the cable runs through a passageway in the cable management device. The passageway may be substantially similar to the passageway 208, described above with reference to FIGS. 2, 3, 4, 5, 6, and 7. In an embodiment, the cable management devices are attached to the cables by a user of the associated IHS. In an embodiment, the cable management devices may be attached by a manufacturer of an IHS. The cable management device for each cable may be selected based on the color of the device. For example, a color could be a designator for a functionality of the cable, an indication of the IHS to which it is associated, and/or other designations.

The cable management devices may be operable to be positioned on the cable such that the cable management devices are selectively moveably, for example, do not slide along the cable without force being applied by the user and/or other outside force. In an embodiment, the cable management device includes securing members and/or cable positioning members that apply a force to the cable. The securing members and/or cable positioning members may be substantially similar to the securing members 214 and/or cable positioning members 216, described above with reference to FIGS. 2, 3, 4, 5, 6, and 7. The cable positioning members may allow the cable management device to be operable to hold cables of differing circumferences within its passageway.

The method 1100 then proceeds to step 1108 where an identification may be applied to one or more of the cable management devices. In an embodiment, the identification may be applied prior to the attachment of the cable management device to the cable. In an embodiment, the identification is a label, such as the label 804, described above with reference to FIG. 8. The labels may be permanent or removable. In an embodiment, the identification is marked onto the cable management device (e.g., by pen, marker, etc), such as described with reference to label 806 of FIG. 8. In an embodiment, step 1108 is omitted.

The method 1100 then proceeds to step 1110 where one or more cable management devices are interlocked to form a cable management group. The cable management group may include a number of cables, each having a cable management device attached thereto. The determination of which cables are included in a cable management groups may include factors such as, for example, the associated IHS, the functionality of the cable, the physical location of the cable, and/or other suitable factors. The cable management group may include cable management devices of the same or differing colors.

In embodiments, the method 1100 may further include attaching a securing device to one or more of the cable management devices. The securing device may be substantially similar to the securing device 902, described above with reference to FIG. 9. The securing device may be further attached to another cable management device, another cable management device in another cable management group, an IHS, a piece of associated equipment (e.g., rack), and/or other suitable location. The securing device may permanently or temporarily attach to the cable management device.

In embodiments, the method 1100 may further include detaching one or more cables from a cable management group. The detaching may include removing a protrusion of one cable management device from an aperture of an adjacent cable management device. In an embodiment, the detaching does not require the cable management device to be removed from the cable. The protrusion may be substantially similar to the protrusion 212, discussed above with reference to FIGS. 2, 3, 4, 5, 6, and 7. The aperture may be substantially similar to the aperture 210, discussed above with reference to FIGS. 2, 3, 4, 5, 6, and 7. The detached cable management device(s), and their associated cable(s), may be interlocked with other cable management devices, such as described above with reference to step 1110.

Thus, provided is a U-shaped cable management device, which allows for interlocking with adjacent cable management devices. In an embodiment, the cable management device is a unitary piece. In an embodiment, the cable management device is plastic. The cable management device may be operable to provide identification for the associated cable by its color and/or identification by labeling or marking the cable management device. The cable management device may also be operable to be interlocked and subsequently detached from other cable management devices without removal from a cable. The cable management device may also include an aperture for attaching a securing item, such as, for example, a tie or strap. The cable management devices may be interlocked to provide cable management groups of any number of cables. The cable management device may also include a plurality of securing members and/or cable positioning members, which ensure the cable management device fits onto various sizes of cables and/or prevents the cable management device from unwanted movement on the cable (e.g., sliding).

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A cable management device, comprising:
 a first leg and a second leg connected by a connecting crown member;
 a first protrusion disposed on the first leg and a second protrusion disposed on the second leg;
 a first securing member disposed on the first leg and spaced apart from the first protrusion, and a second securing member disposed on the second leg and spaced apart from the second protrusion;
 a first aperture in the first leg and a second aperture in the second leg; and
 a passageway defined by an inner-surface of the first leg, an inner-surface of the second leg, and an inner-surface of the connecting crown member, wherein the first securing member and the second securing member are operable to hold a cable in the passageway.

2. The cable management device of claim 1, wherein each of the first leg and the second leg have a free end.

3. The cable management device of claim 2, wherein the first protrusion extends perpendicularly from the free end of the first leg and the second protrusion extends perpendicularly from the free end of the second leg.

4. The cable management device of claim 1, wherein the first protrusion includes a portion that extends perpendicular to an inner-surface of the first leg.

5. The cable management device of claim 1, wherein the first leg, the second leg, and the connecting crown member are a unitary piece.

6. The cable management device of claim 1, wherein the first leg, the second leg, and the connecting crown member are plastic.

7. The cable management device of claim 1, wherein the second aperture has a length approximately equal to a length of the second protrusion.

8. The cable management device of claim 1, further comprising:
a cable positioning member extending into the passageway and operable to engage a cable in the passageway to resist movement of the cable relative to the passageway.

9. The cable management device of claim 1, wherein cable positioning member is resiliently biased towards the passageway.

10. An information handling system (IHS), comprising:
a chassis;
a cable assembly extending from the chassis, wherein the cable assembly includes a first cable and a second cable;
a first cable management device connected to the first cable, such that the first cable extends through a first passageway of the first cable management device, and wherein the first cable management device includes an aperture and a first cable positioning member that extends into the first passageway to engage the first cable and resist movement of the first cable relative to the first passageway; and
a second cable management device connected to the second cable, such that the second cable extends through a second passageway of the second cable management device, wherein the second cable management device includes a protrusion and a second cable positioning member that extends into the second passageway to engage the second cable and resist movement of the second cable relative to the second passageway, and wherein the first cable management device and the second cable management device are operable to be interlocked by positioning the protrusion in the aperture.

11. The IHS of claim 10, wherein the protrusion of the second cable management device is disposed in the aperture of the first cable management device.

12. The IHS of claim 10, wherein the first cable management device and the second cable management device are different colors.

13. The IHS of claim 10, wherein the first cable management device includes a label.

14. An information handling system (IHS), comprising:
a chassis;
a cable assembly extending from the chassis, wherein the cable assembly includes a first cable and a second cable;
a first cable management device connected to the first cable such that the first cable extends through a first passageway of the first cable management device, and wherein the first cable management device includes a first aperture; and
a second cable management device connected to the second cable such that the second cable extends through a second passageway of the second cable management device, wherein the second cable management device includes a protrusion, and wherein the first cable management device and the second cable management device are operable to be interlocked by positioning the protrusion in the first aperture, and wherein the second cable management device includes a second aperture, and wherein a securing device that is operable to secure the second cable management device to another structure is connected to the second cable management device by the second aperture.

15. The IHS of claim 10, wherein the first cable and the second cable are different sizes.

16. A method of cable management, comprising:
providing a cable assembly having a first cable and a second cable;
providing a first cable management device and a second cable management device, wherein the first cable management device includes at least one first protrusion and at least one first aperture, and the second cable management device includes at least one second protrusion and at least one second aperture;
attaching the first cable management device to the first cable such that the first cable is held in a first passageway of the first cable management device by at least one first securing member on the first cable management device that is spaced apart from the at least one protrusion;
attaching the second cable management device to the second cable such that the second cable is held in a second passageway of the second cable management device by at least one second securing member on the second cable management device that is spaced apart from the at least one second protrusion; and
interlocking the first cable management device and the second cable management device, wherein the interlocking includes positioning the at least one first protrusion of the first cable management device into the at least one second aperture in the second cable management device.

17. A method of cable management, comprising:
providing a cable assembly having a first and second cable;
providing a first and a second cable management device, wherein the first and the second cable management devices are each U-shaped;
attaching the first cable management device to the first cable and attaching the second cable management device to the second cable;
interlocking the first cable management device and the second cable management device, wherein the interlocking includes positioning a portion of the first cable management device into an aperture in the second cable management device;
attaching a securing device to an aperture of the first cable management device; and
securing the first cable management device to another structure using the securing device.

18. The method of claim 16, further comprising:
detaching the first cable management device and the second cable management device; and
interlocking the first cable management device and a third cable management device.

19. The method of claim 16, further comprising:
resisting movement of the first cable relative to the first passageway using a first cable positioning member extending from the first cable management device; and
resisting movement of the second cable relative to the second passageway using a second cable positioning member extending from the second cable management device.

20. The method of claim 16, wherein the providing the first and second cable management device includes:
determining the functionality of the first and the second cable; and
selecting the first cable management device having a first color and selecting the second cable management device having a second color different than the first color, wherein the selecting is based on the determined functionality.

* * * * *